United States Patent [19]
Glenboski et al.

[11] Patent Number: 5,782,165
[45] Date of Patent: Jul. 21, 1998

[54] MULTI-PURPOSE COOKING APPARATUS

[75] Inventors: Daniel T. Glenboski, Cleveland; Mark Cartellone, Rocky River; Stanley E. Grzywna, Elyria, all of Ohio

[73] Assignee: Ever Splendor Enterprises Co., Ltd., Taipei, Taiwan

[21] Appl. No.: 182,579

[22] Filed: Jan. 18, 1994

Related U.S. Application Data

[63] Continuation-in-part of Ser. No. 938,811, Sep. 1, 1992, Pat. No. 5,323,692.

[51] Int. Cl.$^6$ ................................................. A47J 37/00
[52] U.S. Cl. ................... 99/340; 99/413; 99/419; 99/422; 99/425; 99/445; 99/446; 99/447; 99/450; 219/401; 219/432; 219/438; 219/439; 219/474
[58] Field of Search ............................ 99/339, 340, 403, 99/410, 413, 415–418, 419, 421 R, 421 H, 421 A, 422, 425, 426, 44–447, 450; 219/401, 432, 436, 438, 439, 454, 472, 474

[56] References Cited

U.S. PATENT DOCUMENTS

| | | | |
|---|---|---|---|
| 1,246,622 | 11/1917 | Lightfoot | 99/340 |
| 1,263,004 | 4/1918 | Tollagsen | 99/413 |
| 1,802,005 | 4/1931 | Detwiler | 99/446 |
| 2,040,479 | 5/1936 | Glore | 99/339 |
| 2,188,757 | 1/1940 | Moon . | |
| 2,631,216 | 3/1953 | Ames . | |
| 2,840,684 | 6/1958 | Watkins, Jr. | 219/436 |
| 3,088,393 | 5/1963 | Huckabee . | |
| 3,307,475 | 3/1967 | Munsey | 99/340 |
| 3,472,151 | 10/1969 | Cox . | |
| 3,577,908 | 5/1971 | Burg | 99/340 |
| 3,789,748 | 2/1974 | Rappoport et al. | 99/340 |
| 3,908,534 | 9/1975 | Martin | 99/415 |
| 4,210,072 | 7/1980 | Pedrini | 99/340 |
| 4,332,188 | 6/1982 | Rhear | 99/421 H |
| 4,430,559 | 2/1984 | Rabay . | |
| 4,509,412 | 4/1985 | Whittenburg et al. | 99/446 |
| 4,650,968 | 3/1987 | Williams | 219/401 |
| 4,889,972 | 12/1989 | Chang | 219/438 |
| 4,920,251 | 4/1990 | Whitenack et al. | 219/401 |
| 4,922,079 | 5/1990 | Bowen et al. | 219/432 |
| 5,097,753 | 3/1992 | Naft | 99/446 |

FOREIGN PATENT DOCUMENTS

| | | | |
|---|---|---|---|
| 427945 | 5/1991 | European Pat. Off. | 219/432 |
| 3600294 | 7/1987 | Germany | 99/403 |
| 3606800 | 9/1987 | Germany | 99/421 H |
| 462612 | 3/1937 | United Kingdom | 99/339 |

*Primary Examiner*—Mark Spisich
*Attorney, Agent, or Firm*—Dilworth & Barrese

[57] ABSTRACT

A multi-purpose cooking appliance comprising: a self-supporting base, a lid mountable on the base, a cooking chamber defined between the base and the lid, a heat conductive pan within the cooking chamber, a heat source connected to the heat conductive pan, removable, elongated skewers for supporting food within said cooking chamber, the skewers being formed of a heat conductive material and having a length sufficient to span the length of the conductive pan and rest thereon, and at least one tray including a surface engageable with a surface on said pan to locate the tray within the cooking chamber, the tray being dimensioned to be spaced from the pan.

11 Claims, 10 Drawing Sheets

MATCH TO FIG. 1B

MATCH TO FIG. 2B

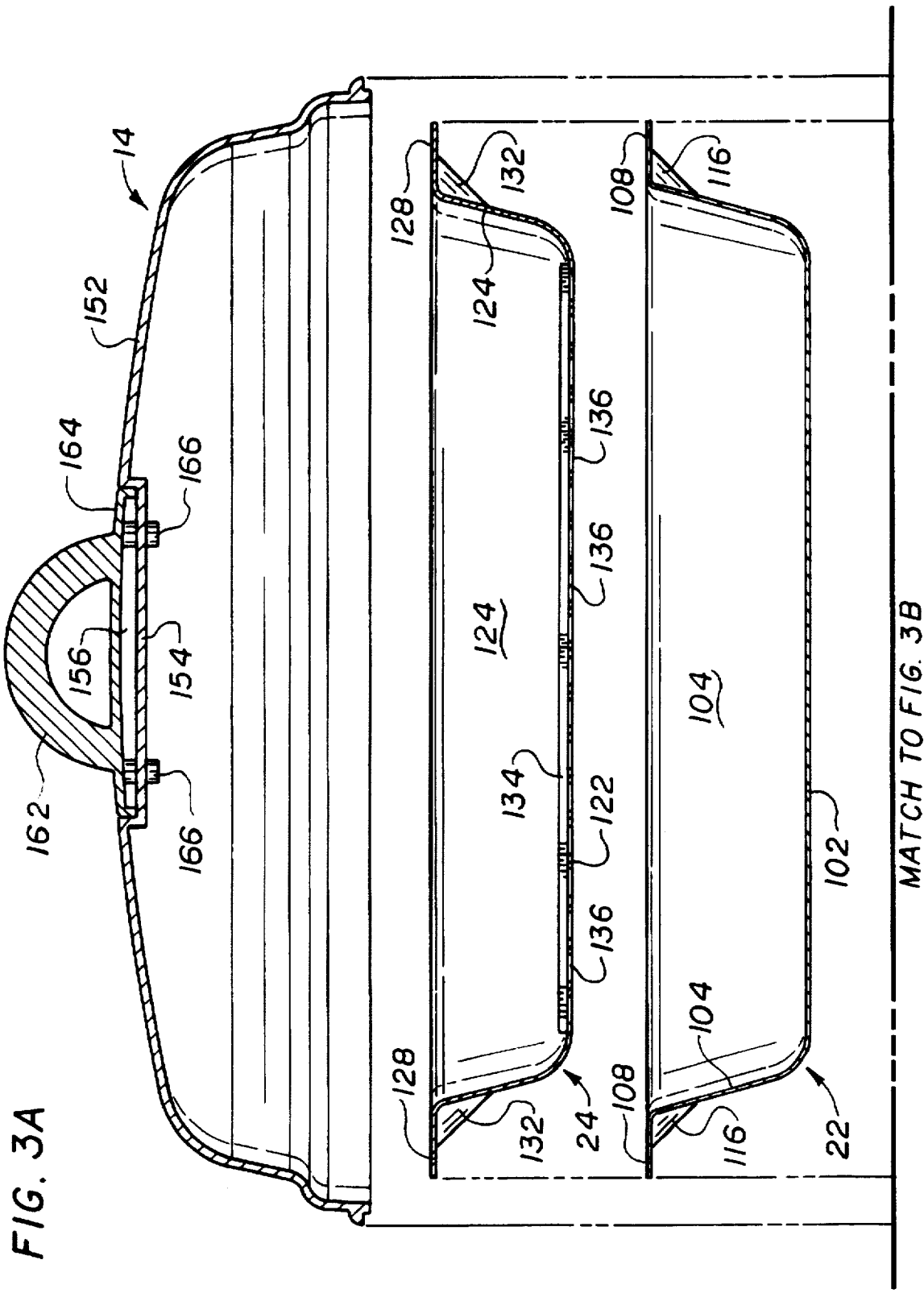

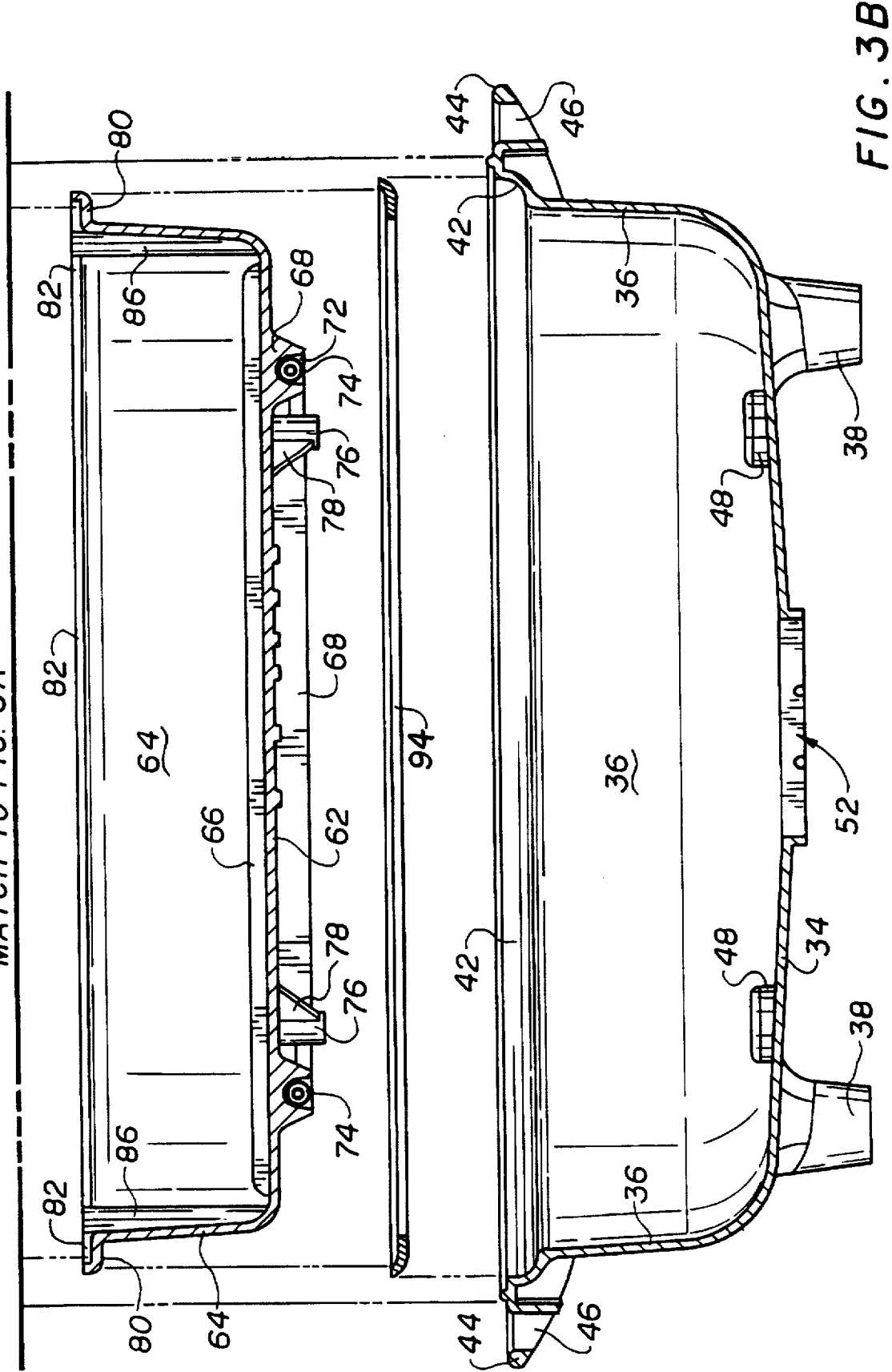

5,782,165

MULTI-PURPOSE COOKING APPARATUS

This is a continuation-in-part of application Ser. No. 07/938,811 filed Sep. 1, 1992, now U.S. Pat. No. 5,323,692.

FIELD OF THE INVENTION

The present invention relates generally to electrical cooking devices, and more particularly to a light weight, portable, multi-purpose cooking appliance suitable for baking, broiling, frying, grilling, roasting, smoking or steaming foods.

BACKGROUND OF THE INVENTION

Many types of consumer appliances are available for cooking foods. Such appliances are generally suitable for one specific application (i.e., frying, steaming, roasting, broiling, etc.) but do not provide the desired versatility to perform other cooking functions. A few appliances combine two or more of the foregoing functions into a single apparatus, while even fewer provide such functions in a portable appliance. The present invention overcomes these short comings and provides a light weight portable cooking appliance suitable for baking, broiling, frying, grilling, roasting, smoking or steaming foods.

SUMMARY OF THE INVENTION

In accordance with the present invention there is provided a multi-purpose cooking appliance including a self-supporting base and a lid mountable on the base. A cooking chamber is defined between the base and the lid, and a heat conductive pan within the cooking chamber has a heat source connected thereto. Removable, elongated skewer means are provided for supporting food within the cooking chamber. The skewer means are formed of a heat conductive material having a length sufficient to span the length of the conductive pan and rest thereon. The appliance further includes at least one tray including surface means engageable with surface means on the pan to locate the tray within the cooking chamber, the tray being dimensioned to be spaced from the pan.

In accordance with another aspect of the present invention, there is provided a multi-purpose cooking appliance including a self-supporting base and a lid mountable thereon. A cooking chamber is defined between the base and the lid, and heat conductive pan is provided within the cooking chamber and has a heat source connected thereto. The pan includes a plurality of heat radiating vanes which extend from the upper surface thereof. A searing plate is provided to be received within the conductive pan. The plate includes a plurality of vanes which extend from the lower surface thereof, the vanes on the plate being greater in height than the vanes on the pan.

In accordance with another aspect of the present invention, there is provided a multi-purpose cooking appliance including a self-supporting base and a lid mountable thereon. A cooking chamber is defined between the base and the lid, and heat conductive pan is provided within the cooking chamber and has a heat source connected thereto. First and second trays are provided to be positioned within the cooking chamber. The first tray includes surface means engageable with surface means on the pan to locate and position the first tray within the cooking chamber, the first tray being dimensioned to be spaced from the pan. The second tray includes deformations engageable with deformations on the first tray to position the second tray in the first tray, the second tray being dimensioned such that the bottom thereof is spaced from the bottom of the first tray.

It is an object of the present invention to provide a multi-purpose cooking appliance which is capable of baking, broiling, frying, grilling, roasting, smoking or steaming foods.

Another object of the present invention is to provide an appliance as described above including a plurality of removable and stackable trays.

Another object of the present invention is to provide an appliance as described above which includes means for cooking foods from the inside while simultaneously cooking the exterior of the foods.

Another object of the present invention is to provide an appliance as described above which includes at least one detachable skewer, which skewer is adapted to extend through a food and to support the food within the appliance.

Another object of the present invention is to provide an appliance as described above having a skewer formed of heat conductive material for conducting heat into the interior of the food.

A still further object of the present invention is to provide an appliance as described above including a searing plate for frying the upper and lower surfaces of foods.

A still further object of the present invention is to provide an appliance as describe above which is light weight and portable.

These and other objects and advantages of the invention will become apparent from the following description of an embodiment thereof taken together with the accompanying drawings.

DESCRIPTION OF THE DRAWINGS

The invention may take physical form in certain parts and arrangement of parts, a preferred embodiment of which will be described in detail in the specification and illustrated in the accompanying drawings wherein:

FIGS. 3A and 3B are sidewise exploded sectional views of the cooking appliance shown in FIGS. 1A and 1B;

FIG. 8 is a partial, sectioned elevational view showing the searing plate shown in FIG. 7 positioned within the heating pan of the base member.

DETAILED DESCRIPTION OF PREFERRED EMBODIMENT

Figure 1A:
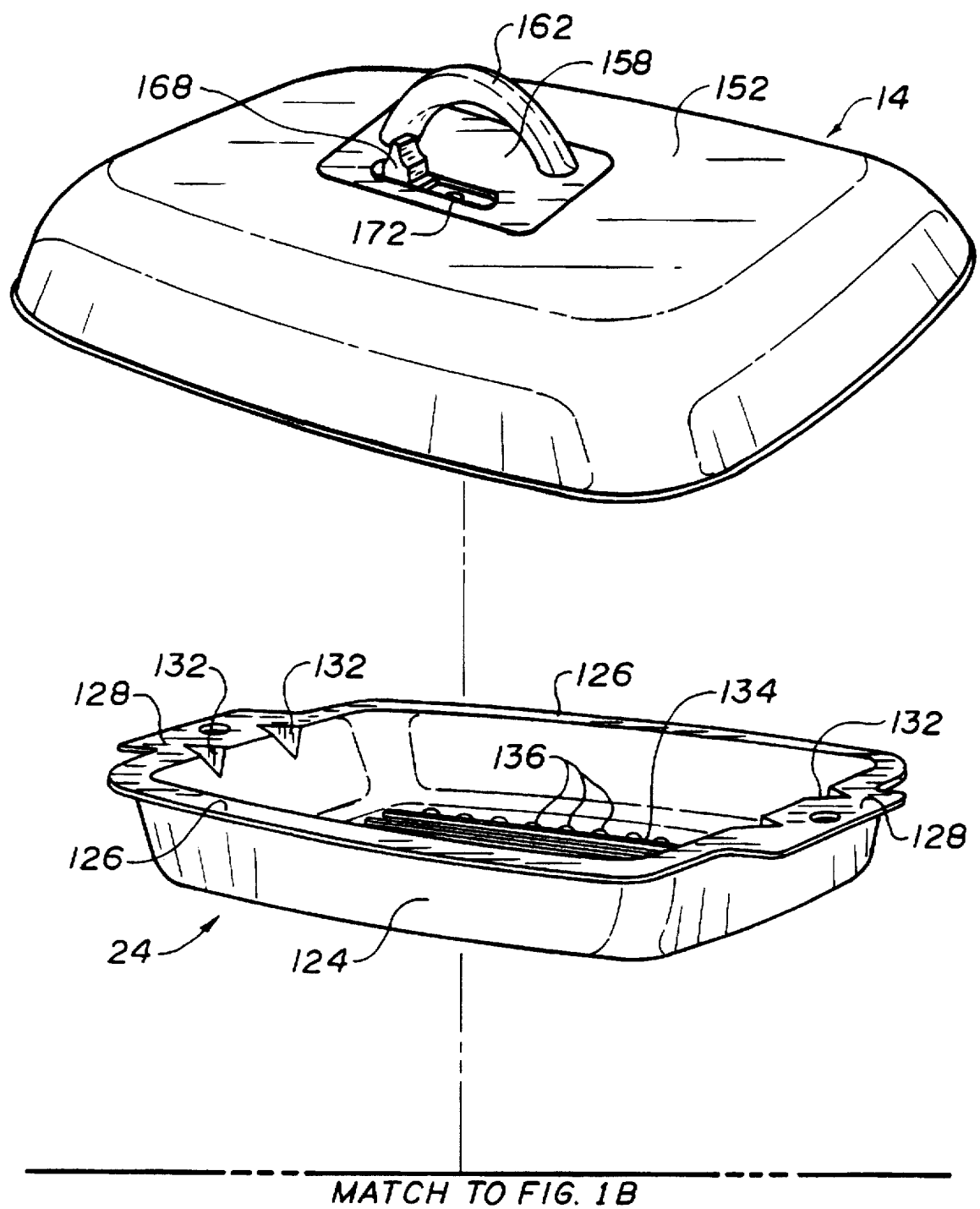
FIGS. 1A and 1B are perspective views of a multi-purpose cooking appliance illustrating a preferred embodiment of the present invention.
Figure 1B:
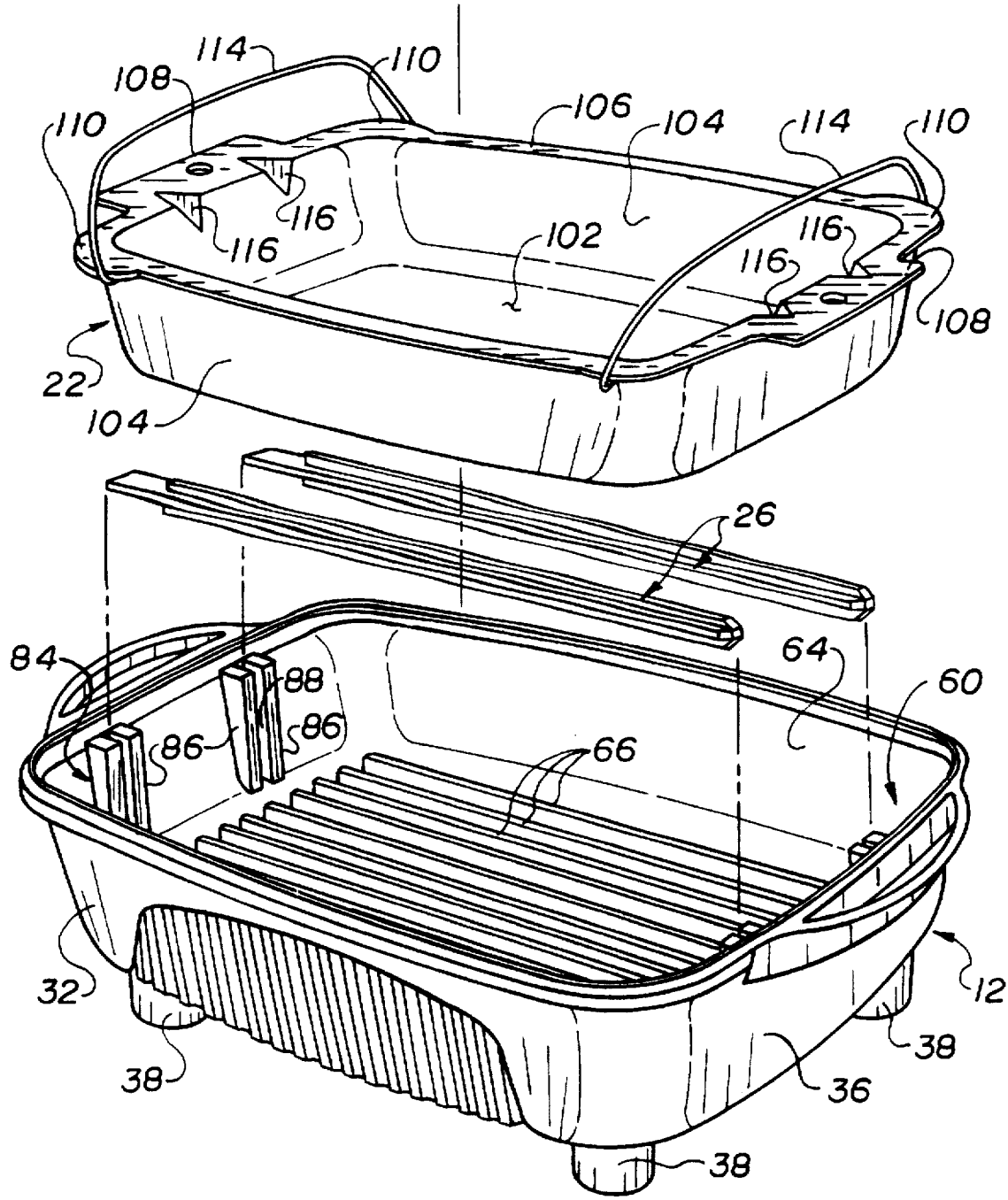
Figure 7:
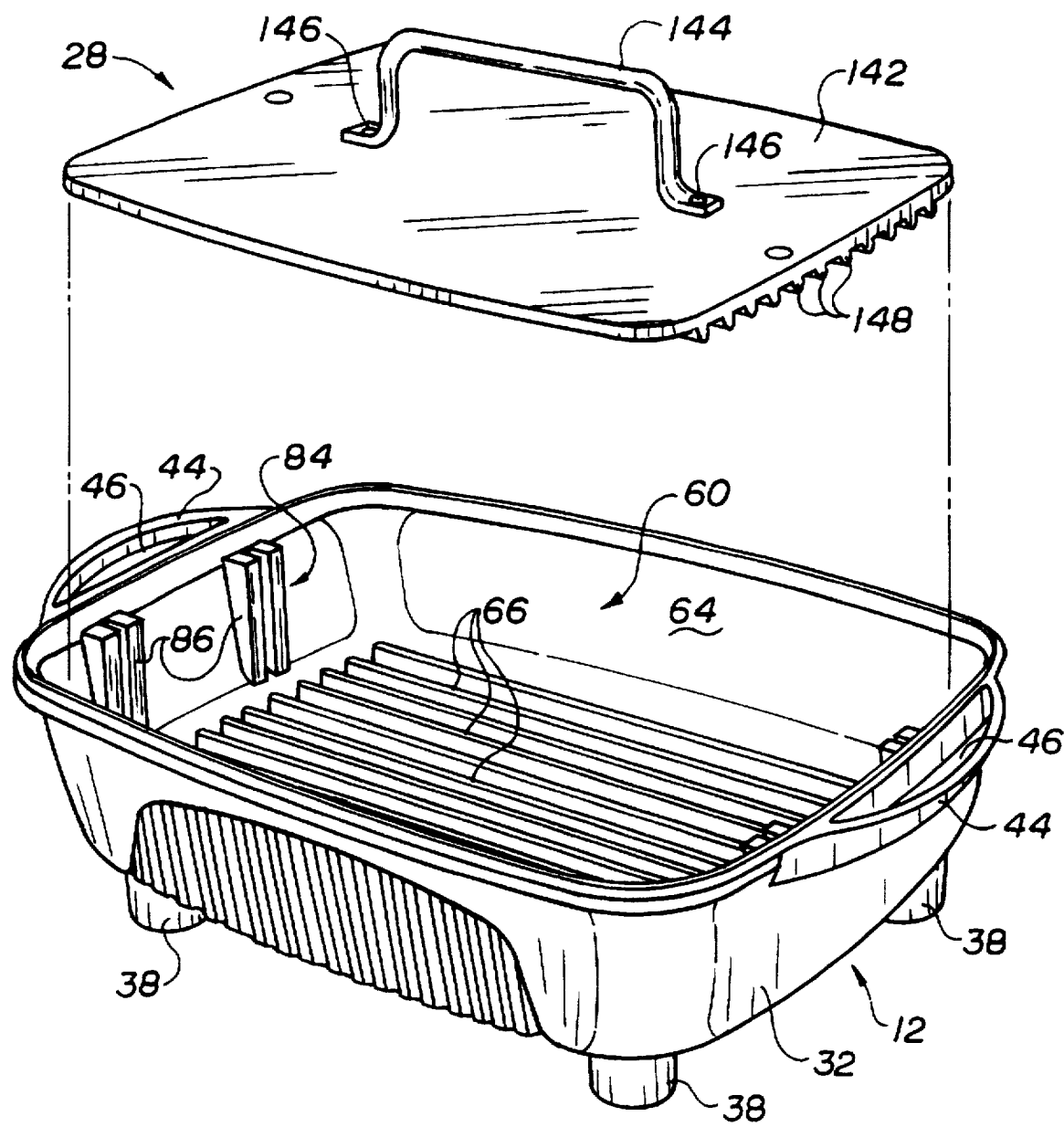
FIG. 7 is an exploded, perspective view of the base of the multi-purpose cooking appliance and a searing plate for use therewith.

Referring now to drawings wherein the showing is for the purpose of illustrating preferred embodiments of the invention only and not for the purpose of limiting same. FIGS. 1A and 1B show a multi-purpose cooking appliance 10 illustrating a preferred embodiment of the present invention. Appliance 10 is similar to the cooking apparatus disclosed in assignee's commonly owned U.S. application Ser. No. 07/938,811 filed Sep. 1, 1992, now U.S. Pat. No. 5,323,692, the disclosure of which is incorporated herein by reference. Appliance 10 is generally comprised of a base 12 and a lid 14 which is dimensioned to be mountable and matingly rest upon base 12. Both base 12 and lid 14 are generally concave in shape, and together define an interior cooking chamber or cavity, designated 16 in the drawings. In the embodiment shown, two trays 22, 24 are provided to be nested within base 12. A plurality of skewers 26, best seen in FIG. 1B, are provided to rest upon base 12 and to support and cook foods within cavity or chamber 16, as will be described in greater detail below. A searing plate 28, best seen in FIG. 7, is provided and dimensioned to rest within base 12.

Figure 2A:
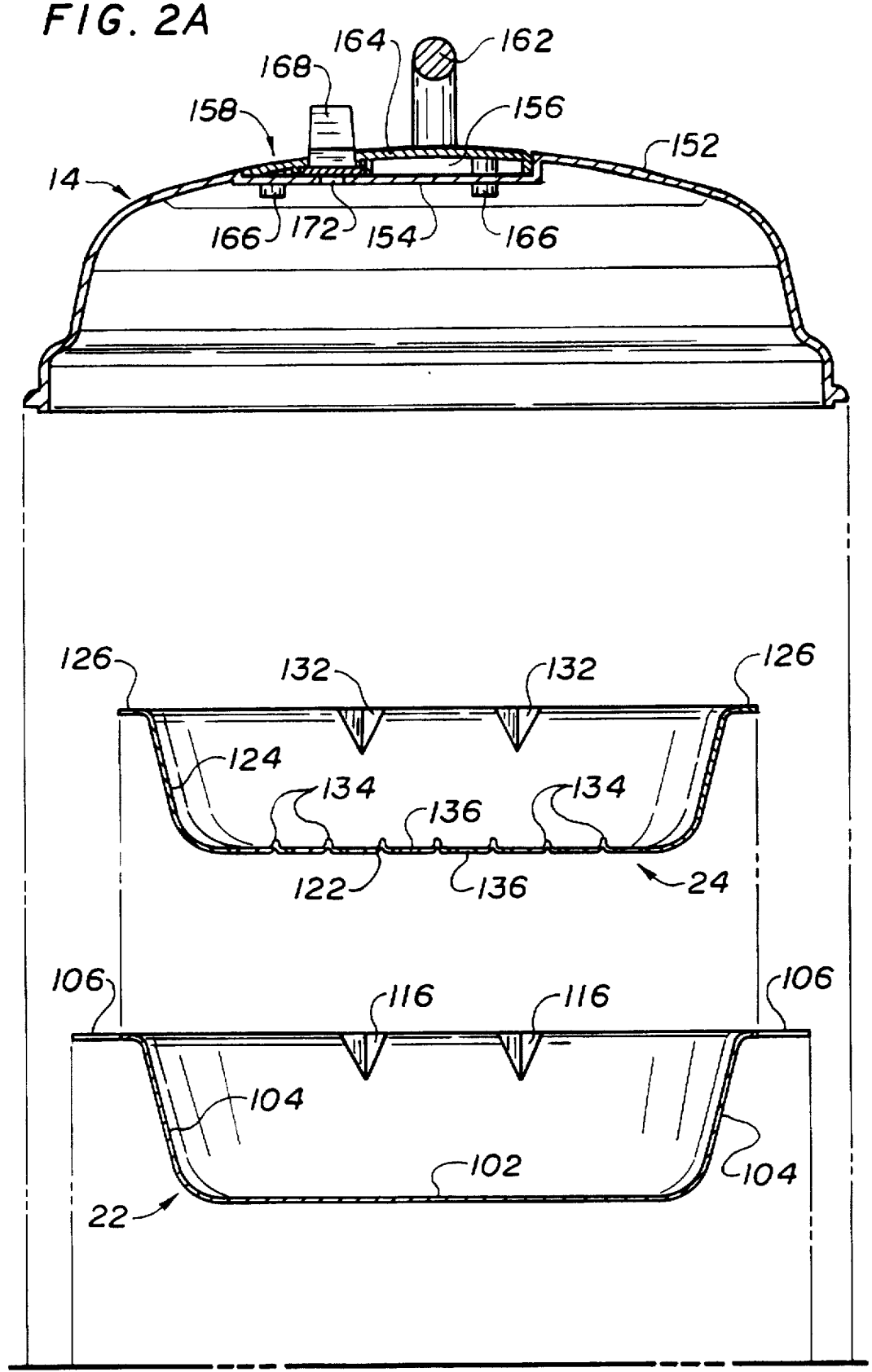
FIGS. 2A and 2B are lengthwise, exploded sectional views of the appliance shown in FIGS. 1A and 1B.
Figure 2B:
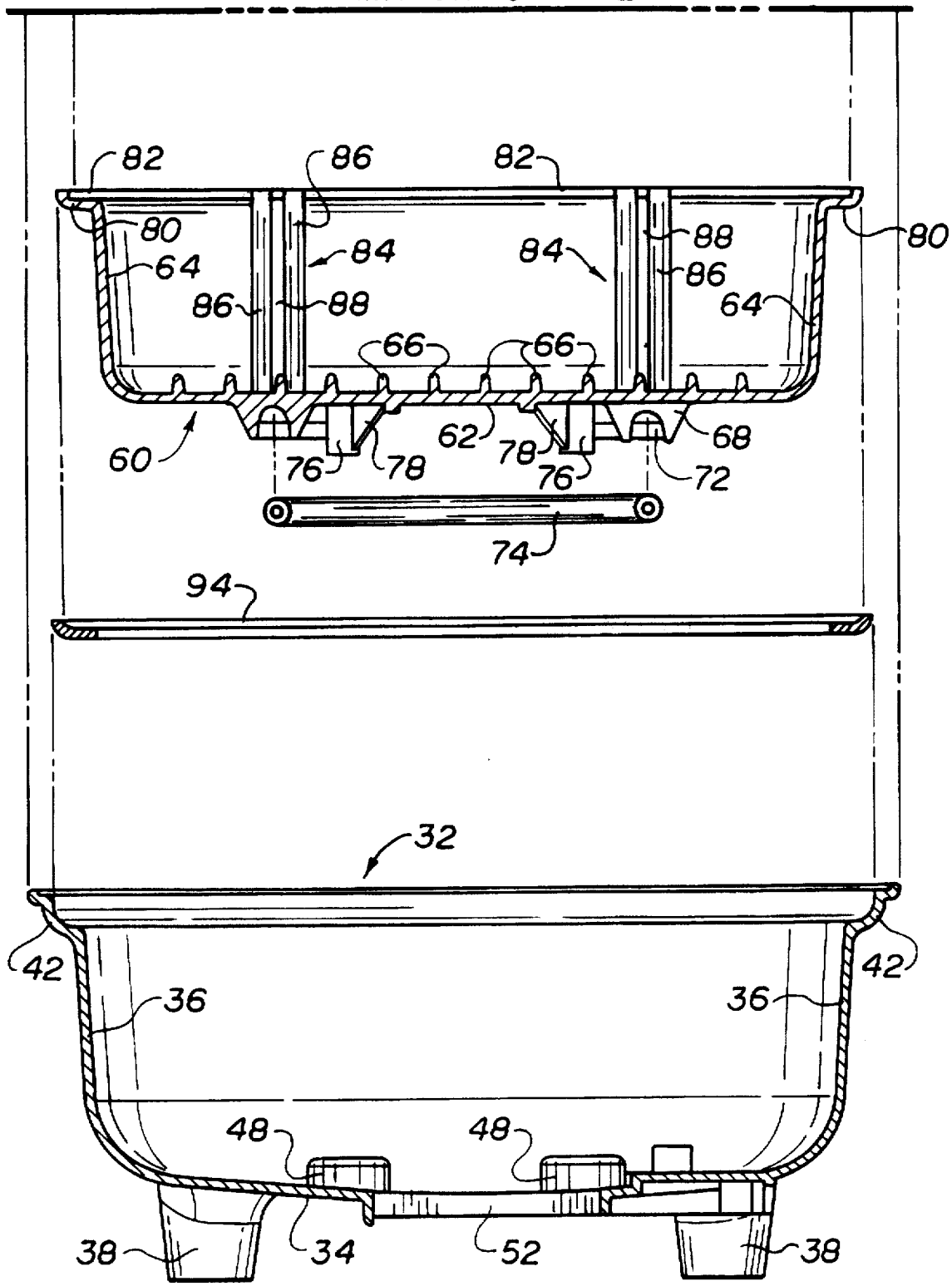

Referring now to FIGS. 2B and 3B, base 12 is best seen. Base 12 is generally comprised of a concave housing 32 formed of a high temperature plastic material. Housing 32 is formed to have a generally flat bottom wall 34 and a side wall 36 which is integrally formed with bottom wall 34 and extends upwardly from the edges thereof. In this respect, housing 32 has a generally closed bottom and an opened upper end defined by the upper peripheral edge of side wall 36. A plurality of downward projecting legs 38, on which housing 32 may be set on a horizontal surface, extend from the bottom wall 34. The upper peripheral edge of side wall 36 is formed to define a generally rounded lip 42. Handles 44 are formed at the longitudinal ends of housing 32. Handles 44 include an opening 46 therethrough. A plurality of support pads 48 are formed along the inner surface of bottom wall 34, and an opening 52 is provided through bottom wall 34, as best seen in FIG. 3B.

A metallic pan 60 is dimensioned to be received within housing 32. In the embodiment shown, pan 60 is preferably formed of a cast aluminum material. Pan 60 has a bottom portion 62 and a upward extending wall portion 64 which is integrally formed with bottom portion 62. The upper surface of bottom portion 62 is generally flat and has a plurality of elongated, side-by-side parallel vanes 66 extending upward therefrom. The underside bottom portion 62 of pan 60 includes an annular rib 68. A recess 72 is formed in rib 68 to receive a conventionally known heating element, designated 74 in the drawings. A plurality of cylindrical mounting bosses 76 having support gussets 78 there formed on the underside of bottom portion 62. The upper peripheral edge of wall portion 64 is formed to define an outward extending flange 80 having an upward facing support surface 82. Spaced-apart columns 84 are provided along the inner surface of wall portion 64 at the longitudinal ends of pan 60, as best seen in FIG. 2B. Each support column 84 is generally comprised of two side-by-side parallel posts 86 having a uniform gap 88 defined therebetween.

Figure 4:
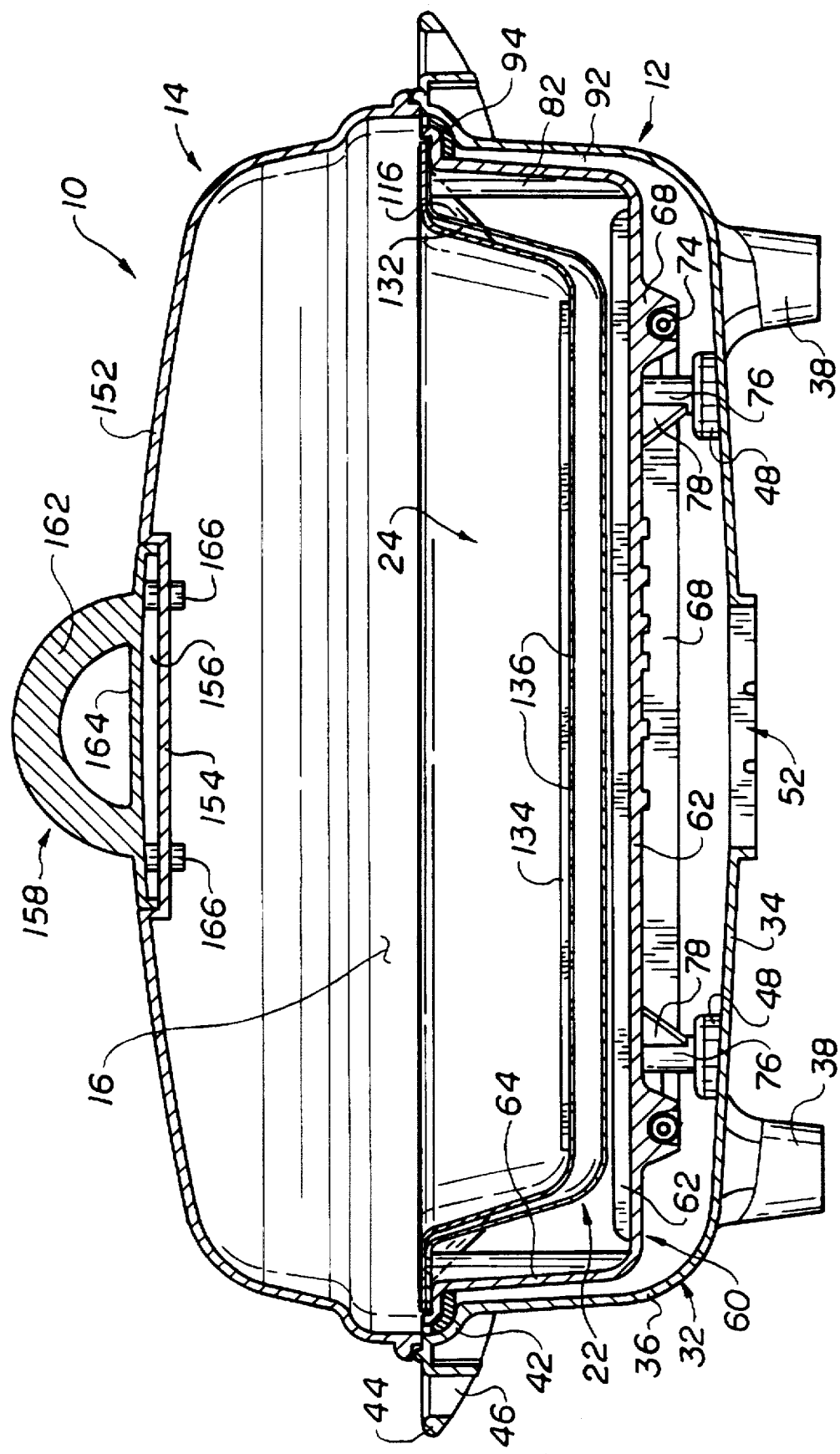
FIG. 4 is a sidewise sectional view of the cooking appliance shown in FIGS. 1A and 1B, showing the respective parts of the cooking appliance in an assembled configuration.
Figure 5:
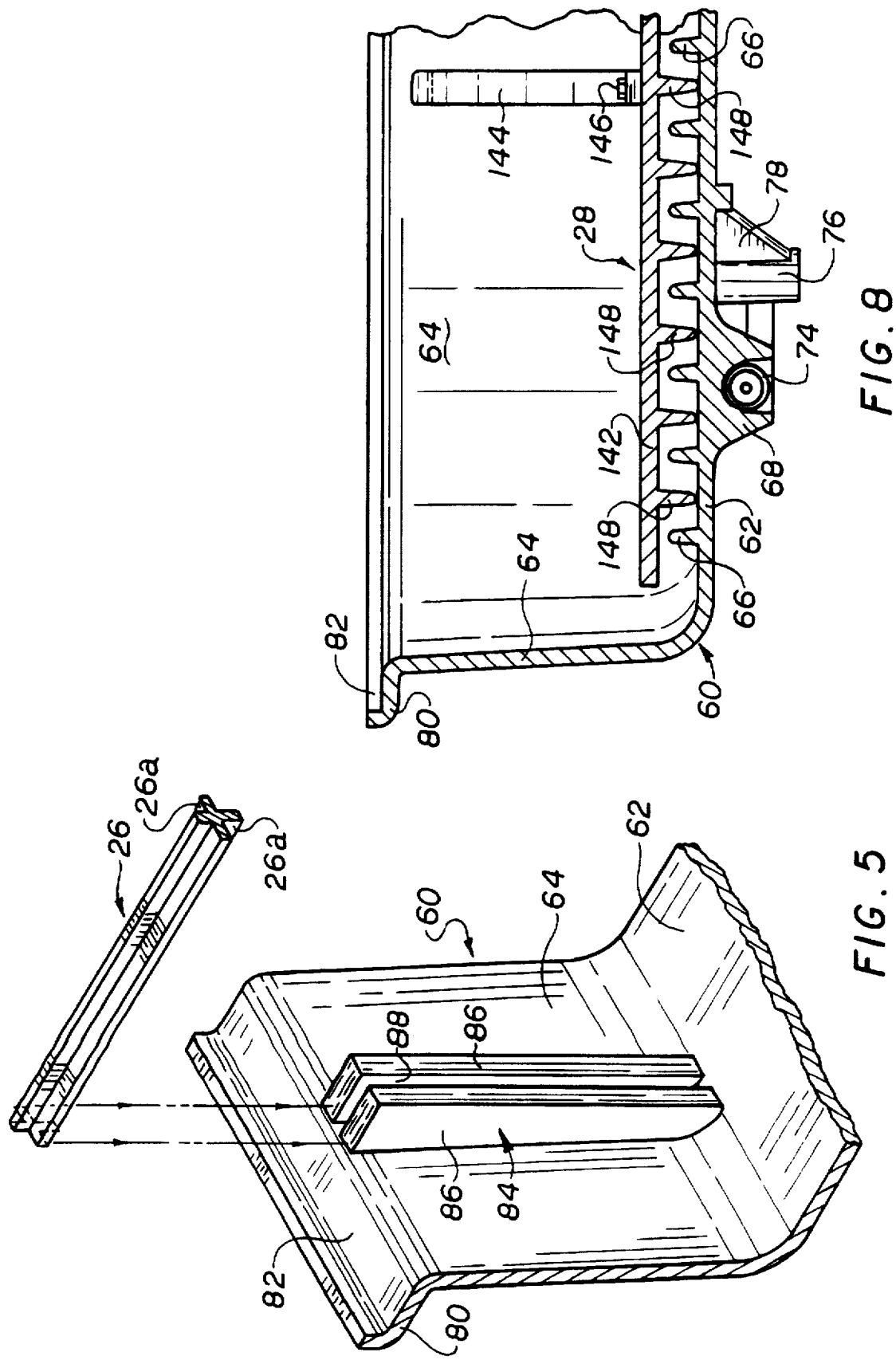
FIG. 5 is a perspective view of a portion of a heating pan from the cooking appliance illustrating the method of mounting a skewer to the heating pan.

Pan 60 is dimensioned to be attached to housing 32 by means of conventional threaded fasteners (not shown) extending through support pads 48 of housing 32 in mounting bosses 76 on pan 60. An air gap 92 is defined between pan 60 and housing 32, as best seen in FIG. 4. A gasket 94, formed of a heat-resistant polymer material, is positioned between flange 80 of pan 60 and lip 42 of housing 32. An electrical heater control circuit (not shown) is positioned between bottom portion 62 of pan 60 and bottom wall 34 of housing 32. The electrical heater control circuit is provided to control operations of heating element 74 in a conventionally known manner. The heater control circuit, in and of itself, forms no part of the present invention and therefore shall not be described in detail. Opening 52 in housing 32 provides access to the electrical heater control circuit.

Figure 6:
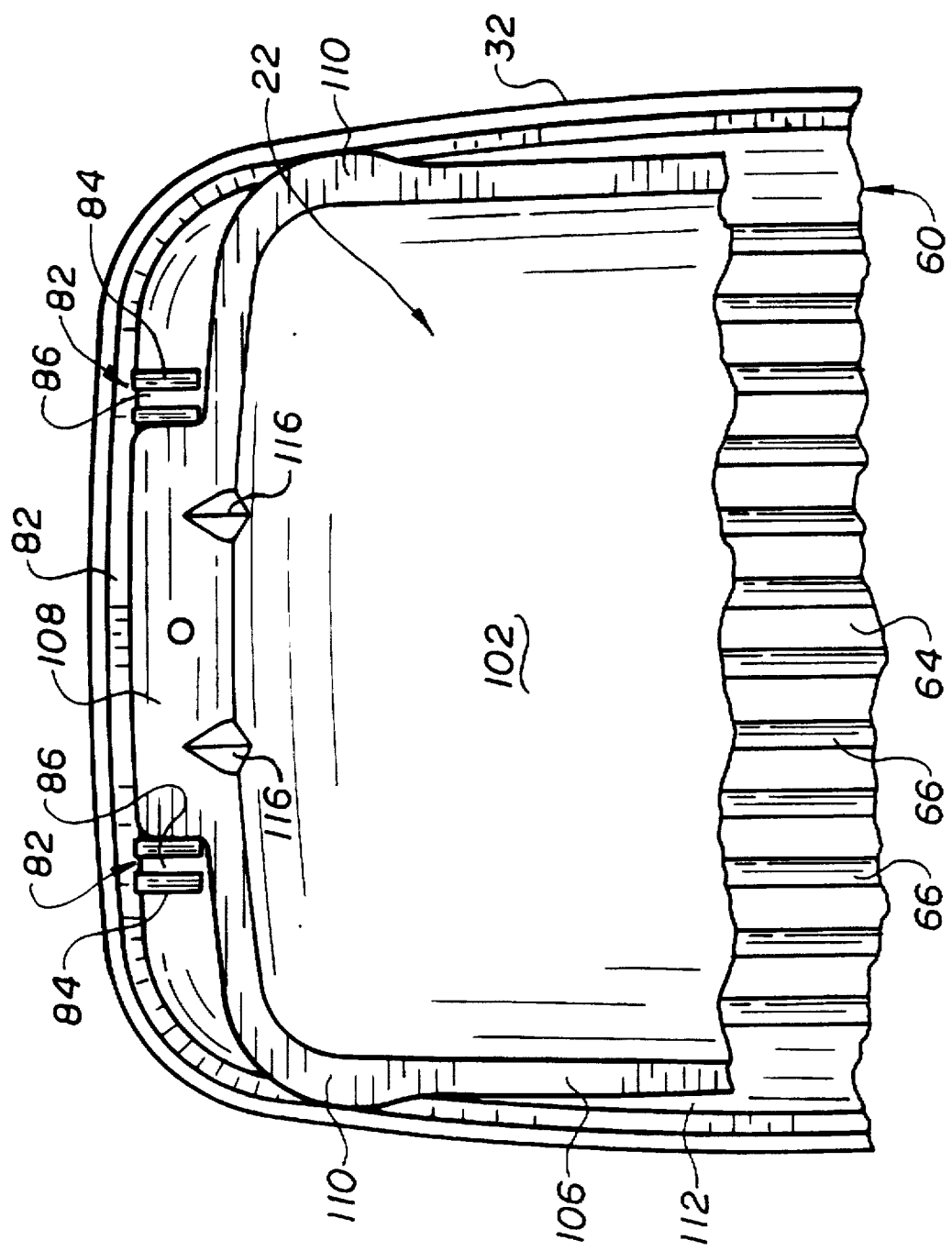
FIG. 6 is a top plan view showing a portion of a tray positioned within the base of the cooking appliance shown in FIGS. 1A and 1B.

Referring now to FIGS. 2A, 2B, trays 22, 24 are best seen. Tray 22 is generally concave and rectangular in shape and has a solid, generally flat bottom panel 102 and a side panel 104 which surrounds and is integrally formed with bottom panel 102. The upper edge of side panel 104 is formed to have a lateral extending flange 106 and rectangular tabs 108 at the longitudinal ends of tray 22. Flange 106 is generally enlarged at corners 110 of tray 22 to enable tray 22 to rest upon support surface 82 of pan 60, as best seen in FIG. 6. Flange 106 and corners 110 are configured such that a gap 112 exists between flange 106 of tray 22 and wall portion 64 and 60 when tray 22 is positioned within pan 60. In the embodiment shown, handles 114 are attached to each end of tray 22. Deformations 116 are formed at each end of tray 22 adjacent tabs 108. Tray 22 is dimensioned to rest within pan 60 with tabs 108 disposed between columns 84 on pan 60 and with tabs 108 and corners 110 of flange 106 resting upon support surface 82 of pan 60.

Referring now to FIG. 1A, 3A and 4, tray 24 is dimensioned to nest within tray 22. To this end tray 24 is also generally concave and rectangular in shape and has a solid, generally flat bottom panel 122 and a side panel 124 which is integrally formed with, and projects upward from, the edges of bottom panel 122. The upper edge of side panel 122 is formed to have a lateral extending flange 126 and tabs 128 are formed at the longitudinal ends of tray 24. Deformations 132 are formed in tray 24 adjacent tabs 128. Bottom panel 122 of tray 24 includes a plurality of spaced-apart parallel rails 134. Between rails 134 a plurality of circular apertures 136 are provided. Tray 24 is slightly shallower than tray 22 such that when nested within tray 22, bottom panel 122 of tray 24 is above and spaced from bottom panel 102 of tray 22. In this respect, tray 24 is generally positioned within tray 22 by means of deformations 132 being in registry with and setting within deformations 116 of tray 22.

In the embodiment shown, two generally identical skewers 26 as best seen in FIG. 1B are provided to support foods within cooking chamber 16 of appliance 10. Because skewers 26 are identical, only one skewer 26 will be described in detail, it being understood that such description applies equally to the other skewer 26. As best seen in FIG. 1B, skewer 26 is generally comprised of an elongated blade formed to include four equally spaced vanes 26a, which are generally disposed at 90° to each other and form a generally decussate cross-section. Skewer 26 is preferably formed of a material having good heat conductive characteristics, and in the embodiment shown, is formed of an aluminum alloy. Each vane 26a is slightly thicker near the axis of skewer 26 and at the outer edge of the vane, such that the angle between the surfaces of adjacent vanes 26a is slightly greater than 90°, and in the embodiment shown is approximately 91°. It will be appreciated from a further reading of the specification, while the embodiment shown discloses a skewer 26 having four vanes, any number of vanes disposed at equal angles relative to each other may be suitable for use with the present invention. Importantly, according to the present invention, skewer 26 is dimensioned such that two vanes 26a rest upon the upper ends of two opposed columns 84, with one vane 26a positioned within gap 88 defined between posts 86. In this position, two vanes 26a rest upon and are in contact with the upper ends of posts 86.

As best seen in FIG. 7, searing plate 28 is provided to be positioned within pan 60. Searing plate 28 is generally a flat plate 142 having a handle 144 attached thereto by fasteners 146. The lower surface of plate 142 includes a plurality of spaced-apart parallel beating vanes 148. Vanes 148 on plate 142 are formed to be juxtapositioned with vanes 66 on pan 60. Importantly, according to the present invention, vanes 148 on plate 142 are longer (i.e., higher) than vanes 66 of pan 60 such that vanes 148 of searing plate 28 engage and rest upon bottom portion 62 of pan 60.

Referring now to FIG. 2A and 2B, lid 14 is best seen. Lid 14 is generally comprised of a concave molded cover 152 having a lower peripheral edge dimensioned to rest upon housing 32. Cover 152 is formed to have a flat planar surface 154 which defines a recess 156 in the contour of lid 14. A molded attachment 158 is formed to be positioned within cut out 156. Attachment 158 includes a generally U-shaped handle 162 and a cover extension or cowling 164. Attachment 158 is press fit onto cover 152 by means of cylindrical posts 166 extending through circular openings in planar surface 154. A slide 168 is dimensioned to be captured between attachment 158 and planar surface 154. Slide 168 is reciprocally movable to open or close a vent or port 172 in cover 152.

Depending upon which of the attachments (i.e., trays 22, 24, skewers 26 or searing plate 28) is used, appliance 10 as described above provides a multi-purpose cooking device for baking, boiling, frying, grilling roasting, smoking or steaming foods. In this respect, providing electrical current to heating element 74 causes the temperature of pan 60 to rise as heat is conducted from heating element 74 through the metallic pan. Housing 32 is isolated from pan 60 by gasket 94. According to the present invention, heating element 74 is dimensioned to provide sufficient current and power to raise the temperature of the inner surface of pan 60 to approximately 500° F. At this temperature, pan 60 is hot enough to broil, fry, roast, smoke, steam or grill foods based upon the components utilized therewith. In one respect, pan 22 may be used alone and positioned within chamber 16 of appliance 10. Food such as chicken, turkey or other meats may be places within tray 22 and roasted therein. By providing wood chips in the space defined between tray 22 and pan 60, foods within tray 22 may be smoked. In this respect, pan 60 provides sufficient heat to cause wood chips to smoke wherein smoke generated thereby permeates through gap 112 defined between tray 22 and pan 60 and permeates the food cooked therein.

Tray 22 and tray 24 may be used together to steam vegetables. In this respect, by adding water within tray 22, vegetables or other foods to be steamed may be placed within tray 24. Heat from pan 60 will cause the water in tray 22 to boil to generate steam which permeates through apertures 136 in tray 24 to steam the foods contained therein. In another respect, tray 24 may be used to prepare meats or other foods in applications where it is desirable that juices or fluids from the meats drip through apertures 136 into tray 22. In such applications, tray 22 may be used as a drip pan to collect juices or fluids.

In another respect, appliance 10 may be used to prepare foods on skewers 26. To this end foods such as vegetables or meat may be impaled upon skewers 26. With the food thereon, skewers may be positioned to rest upon columns 84 formed in pan 60. Because skewers 26 are formed of a heat conductive metal, preferably aluminum, heat generated and conducted through pan 60, is further conducted through skewers 26 to the interior surface of the foods imbedded thereon. Thus, heat generated in skewers 26 is conducted to the interior of the foods which causes the foods to cook from the inside. This is in conjunction with the heat created within chamber 16 by pan 60 which causes the foods to cook from the exterior surface by normal convention heating.

Still further appliance 10 may be used as a griddle to fry foods. In this respect foods may be cooked by placing the foods directly on pan 60. Searing plate 28 may be used to speed cooking of the food on pan 60. To this end, prior to placing the food on pan 60, searing plate 28 may be placed on pan 60 (as shown in FIG. 8) to be heated. Importantly, because vanes 148 on plate 142 are longer (i.e., higher) than vanes 66 of pan 60, they rest on bottom portion 62 of pan 60. Because bottom portion 62 is adjacent heating element 74 searing plate 28 heats rapidly as heat is conducted from bottom portion 62 to vanes 148 and to plate 142. Once searing plate 28 is hot, food may be placed between pan 60 and searing plate 28. The food is thereby cooked from above and below which reduces the overall time required to cook the food.

The present invention thus provides a multipurpose cooking appliance capable of use in a wide variety of cooking applications. The present invention has been described with respect to preferred embodiment. Modifications and alterations will occur to others upon their reading and understanding of the specification. It is intended that all such modifications and alterations be included insofar as they come within the scope of the patent as claimed or the equivalence thereof.

Having thus described in the invention, the following is claimed:

1. A multi-purpose cooking appliance comprising:

a self-supporting base, a lid mountable on said base, a cooking chamber defined between said base and said lid, a heat conductive pan within said cooking chamber, a heat source connected to said heat conductive pan, removable, elongated skewer means for supporting food within said cooking chamber, said skewer means being formed of a heat conductive material and having a length sufficient to span the length of said conductive pan and rest thereon, at least one tray including surface means engageable with surface means on said pan to locate and position said tray within said cooking chamber, said tray dimensioned to be spaced from the pan.

2. A multi-purpose cooking appliance as described in claim 1 further comprising a second tray dimensioned to nest in said first tray and to define a gap therebetween, said second tray including surface means engageable with surface means on said pan wherein said second tray may be positioned within said cooking chamber without said first tray.

3. A multi-purpose cooking appliance as described in claim 1 wherein said pan includes a plurality of longitudinally extending, side-by-side parallel heating vanes, and at least two longitudinally spaced columns, defining a mounting surface on which said skewer means may rest.

4. A multi-purpose cooking appliance as described in claim 1 further comprising a searing plate dimensioned to set in said pan and be in surface contact therewith.

5. A multi-purpose cooking appliance as described in claim 4 wherein said pan includes a plurality of longitudinally extending, side-by-side parallel heating vanes, on the upper surface thereof and said searing plate includes a plurality of longitudinally extending, side-by-side parallel heating vanes, said vanes on said plate being higher than said vanes on said pan and disposed thereon to be juxtaposed relative to said vanes on said pan when said plate is positioned therein.

6. A multi-purpose cooking appliance comprising:

a self-supporting base, a lid mountable on said base, a cooking chamber defined between said base and said lid, a heat conductive pan within said cooking chamber having a heat source connected thereto, said pan having a plurality of heat radiating vanes extending from an upper surface thereof, and a plate dimensioned to be received within said conductive pan, said plate having vanes higher than the vanes on said pan so that the vanes on said plate are adapted to engage and rest upon said upper surface of said pan.

7. A multi-purpose cooking appliance as described in claim 6 further comprising:

removable, elongated skewer means for supporting food within said cooking chamber, said skewer means being formed of a heat conductive material and having a length sufficient to span the length of said conductive pan and rest thereon.

8. A multi-purpose cooking appliance as described in claim 6 further comprising at least one tray including surface means engageable with surface means on said pan to locate and position said tray within said cooking chamber.

9. A multi-purpose cooking appliance comprising:

a self-supporting base, a lid mountable on said base, a cooking chamber defined between said base and said lid, a heat conductive pan within said cooking chamber, a heat source connected to said heat conductive pan, a first and second trays dimensioned to be positioned within said cooking chamber, said first tray including surface means engageable with surface means on said pan to locate and position said first tray within said cooking chamber, at least a portion of said surface means of said first tray being spaced from said surface means of said pan to permit circulation within said cooking chamber between said first tray and said pan, said second tray including deformations engageable with deformations on said first tray to position said second tray in said first tray, said second tray dimensioned such that the bottom thereof is spaced from the bottom of said first tray.

10. A multi-purpose cooking appliance as described in claim 9 wherein said second tray includes a plurality of rails formed along the bottom thereof and a plurality of apertures formed through the bottom thereof.

11. A multi-purpose cooking appliance as described in claim 9 wherein said second tray includes surface means engageable with said surface means on said first tray, at least a portion of said surface means of said second tray being spaced from said surface means of said first tray to permit circulation within said cooking chamber between said pan, said first tray and said second tray.

* * * * *